INVENTOR.
Carl A. Berggren
BY Schroeder, Hofgren,
Brady & Wegner
Attorneys

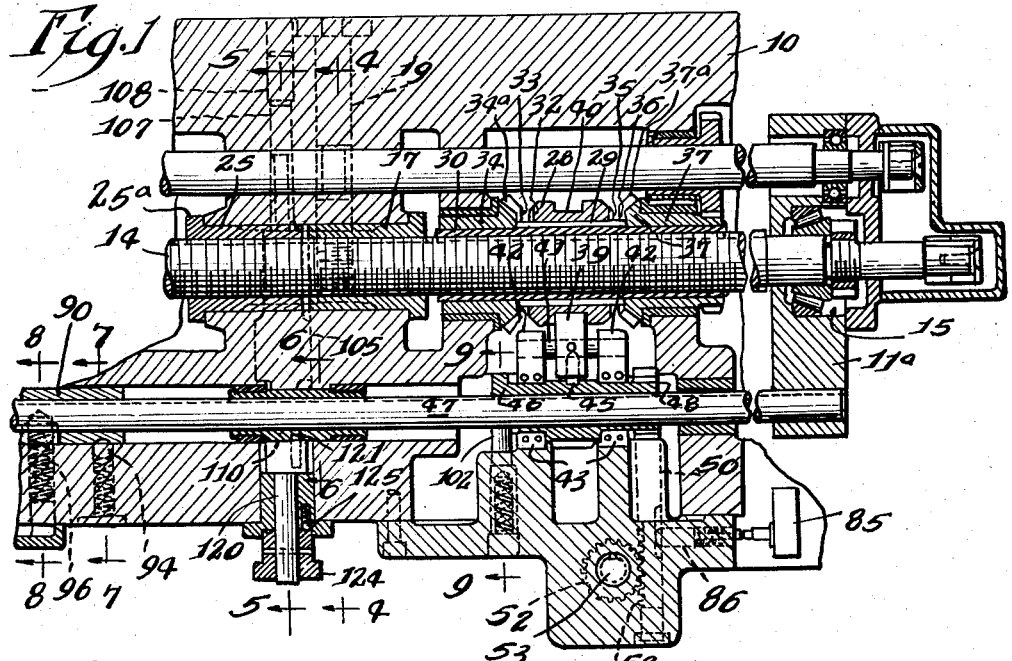
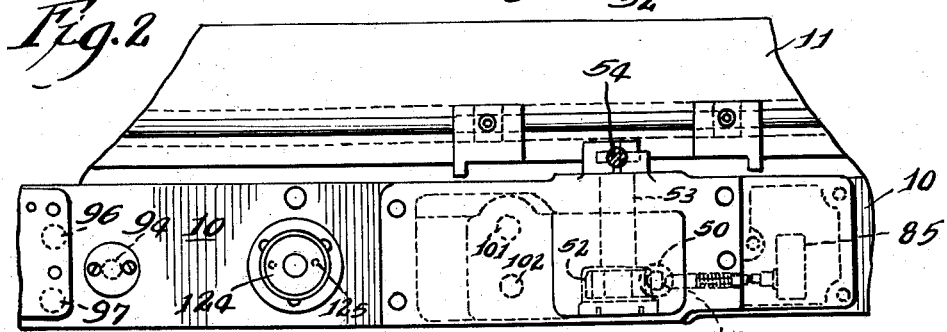
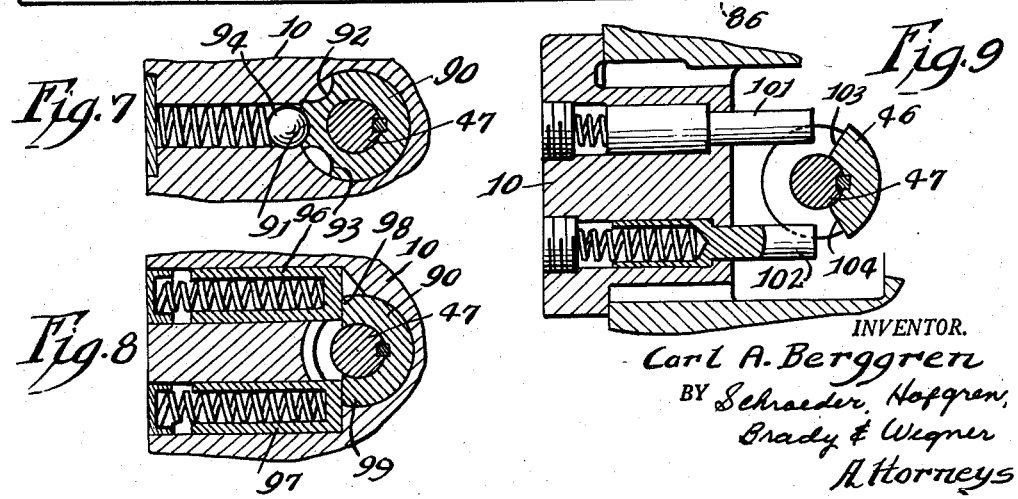
INVENTOR.
Carl A. Berggren
BY Schroeder, Hofgren,
Brady & Wegner
Attorneys Sept. 15, 1959 C. A. BERGGREN 2,903,902
BACKLASH TAKEUP MECHANISM
Filed Dec. 26, 1957 2 Sheets-Sheet 2

United States Patent Office 2,903,902
Patented Sept. 15, 1959

2,903,902
BACKLASH TAKEUP MECHANISM

Carl A. Berggren, Rockford, Ill., assignor to Sundstrand Machine Tool Co., a corporation of Illinois Application December 26, 1957, Serial No. 705,435

12 Claims. (Cl. 74—441)

This invention relates to a backlash eliminator or backlash takeup mechanism, and more particularly to such a mechanism for a work table drive in a milling machine.

It is a geenral object of the invention to provide a new and improved backlash takeup mechanism of the type described.

Another object is to provide a new and improved automatic backlash takeup mechanism for a milling machine work table drive wherein a backlash takeup element is automatically moved to a takeup position when the drive is engaged at a feed rate either forwardly or reversely and wherein the takeup element is automatically moved to a release position when the drive is placed in neutral or engaged for rapid traverse either forwardly or reversely.

A further object is to provide a backlash takeup mechanism of the type described including selectively operable means for disabling the takeup mechanism for up milling operations, sometimes called conventional milling, and for rendering the takeup mechanism operative for down milling operations, sometimes called climb milling.

Other objects and advantages will become readily apparent from the following detailed description taken in connection with the accompanying drawings, in which:

Fig. 1 is a fragmentary horizontal sectional view through a milling machine embodying the principles of the present invention, with the various parts in neutral positions, the view being taken at about the line 1—1 of Fig. 5;

Fig. 2 is a fragmentary front elevational view of the structure illustrated in Fig. 1;

Fig. 7 is an enlarged fragmentary sectional view taken at about the line 7—7 of Fig. 1;

Fig. 8 is an enlarged fragmentary sectional view taken at about the line 8—8 of Fig. 1; and Fig. 9 is an enlarged fragmentary sectional view taken at about the line 9—9 of Fig. 1.

Figure 3:
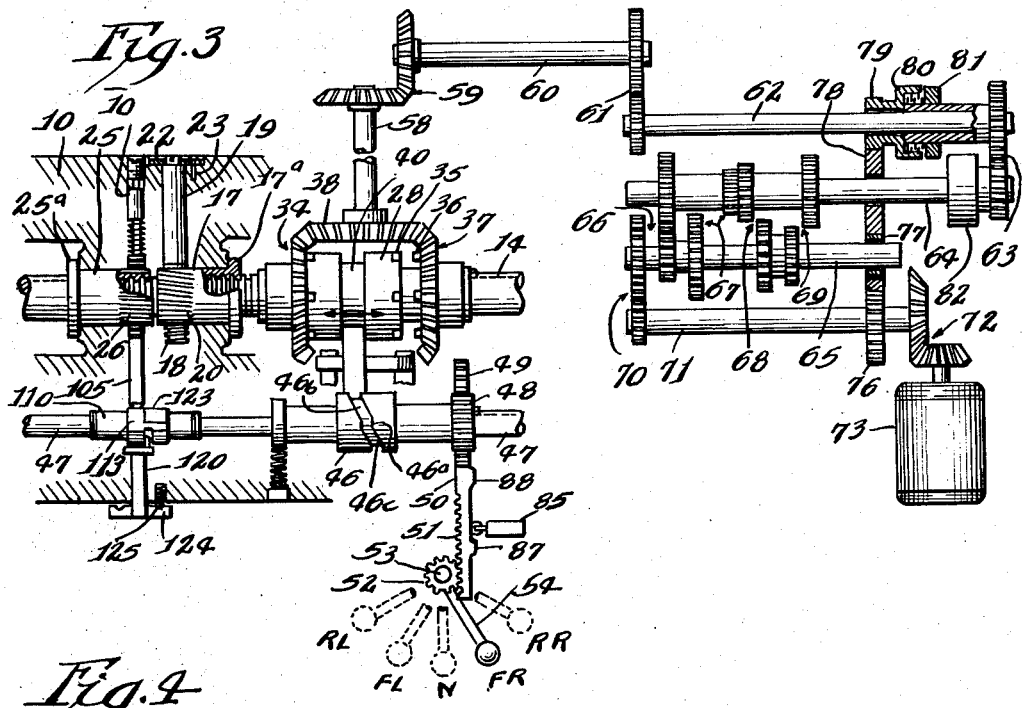
Fig. 3 is a diagrammatic illustration of the work table drive including the backlash takeup mechanism, with the parts positioned to obtain a "feed right" movement of the work table.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Referring now to the drawings in more detail, as illustrated, the invention is embodied in a knee type milling machine which includes a base or work table support 10 having a work table 11 slidably supported thereon and guided by conventional means 12.

The work table is adapted to be moved reciprocably by a table drive mechanism including a table feed screw 14 having oppoist ends journalled for rotation in depending portions of the table in a conventional manner. As illustrated, the right end of the feed screw (Fig. 1) is supported in a bearing 15 carried in a bracket 11a depending from one end of the work table. The feed screw threadably engages a feed nut 17 which is supported in the base 10 and fixed in position thereon so that rotation of the feed screw in the stationary nut causes longitudinal movement of the screw and the work table relative to the base. The feed nut is locked in position by means of a lock worm 18 (Figs. 3 and 4) formed on the end of a shaft 19 which is rotatable in the base 10, the worm engaging helical gear teeth 20 formed externally on the feed nut. Adjacent the rear of the base, the shaft 19 has an operating disc 22 secured thereon and adapted to be fixed in adjusted positions by means of a set screw 23. It will be understood that the shaft 19 and the worm 18 are rotatable to turn the feed nut 17 on the feed screw until an annular shoulder 17a on the nut abuts against a portion of the base 10, whereupon the shaft 19 may be locked in position to firmly hold the feed nut.

A takeup nut 25 is threaded on the feed screw and rotatably supported in the base 10, and includes external gear teeth 26 which are utilized, as explained in more detail presently, to turn the takeup nut between a release position permitting a free operating engagement between the feed screw 14 and the nuts and a takeup position which maintains a tight working engagement between the feed screw and the two nut elements, in the latter of which positions an angular shoulder 25a on the takeup nut abuts against a portion of the base 10.

Figure 4:
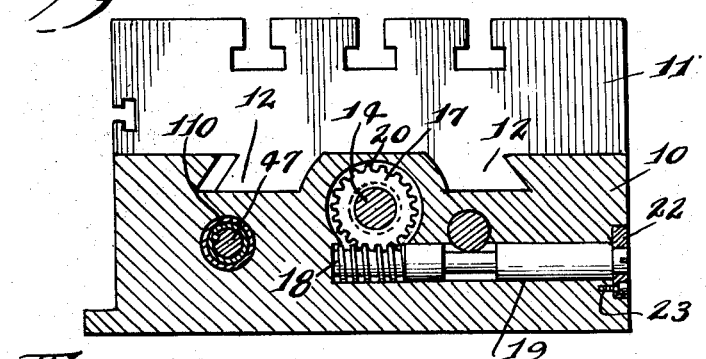
Fig. 4 is a transverse vertical sectional view taken at about the line 4—4 of Fig. 1.

The feed screw 14 is driven by means of a driven clutch element 28 which is splined at 29 to rotate with and slide axially on an elongated bearing sleeve 30 in turn keyed on the feed screw 14 to drive the latter while permitting longitudinal movement thereof. The clutch element 28 is a double acting reversing clutch member having a neutral center position illustrated in Fig. 1, and may be moved to the left as viewed in Fig. 1 to a position (illustrated in Fig. 3) wherein clutch teeth 32 thereon mesh with clutch teeth 33 on a driving clutch element 34 to cause rotation of the feed screw in one direction. Alternatively, the clutch element 28 may be moved toward the right to a position wherein clutch teeth 35 thereon mesh with clutch teeth 36 on a driving clutch element 37 to cause rotation of the feed screw in the opposite direction. The driving clutch elements 34 and 37 have bevel gear teeth 34a and 37a respectively, both of which mesh with a continuously driven bevel drive gear 38 (Fig. 3). Clutch elements 34 and 37 are thereby continuously driven in opposite directions during operation of the machine, and thus may be utilized to drive the feed screw 14 in opposite directions, the gear 34 being utilized to obtain feed right and rapid right movement of the table 11, and the gear 37 being utilized to obtain feed left and rapid left movement of the table, as will be described in more detail presently.

The axially slidable clutch element 28 is controlled by an actuator 39 fitting a groove 40 on the clutch element and fixed on a rod 41 axially slidable in a pair of supporting bearings 42 suitably secured to the base 10 as at 43. The actuator 39 is movable to shift the clutch element 28 by means of a cam pin 45 suitably secured in the actuator and receivable in a cam slot on a cylindrical cam 46 slidably keyed on a rotatable control shaft 47 to rotate therewith. Rotation of the control shaft 47 is effected through the medium of a pinion gear 48 formed integrally on the sleeve cam 46 and meshing with gear teeth 49 (Fig. 3) formed at the end of a reciprocable rack 50. The rack may be reciprocated through the medium of gear teeth 51 formed thereon and meshing wih a pinion 52 secured on the lower end of a vertically disposed shaft 53 mounted in the base 10 and manually rotatable by means of a hand lever 54 suitably secured to the upper end of the shaft.

The manually accessible control handle 54 is movable through a range of five angularly spaced positions illustrated in Fig. 3, including a neutral center position identified as N, feed right and rapid traverse right positions successively spaced in one direction (counterclockwise) from the neutral position and identified respectively as FR and RR, and feed left and rapid traverse left positions successively spaced angularly in the opposite direction from the neutral position and identified respectively as FL and RL. Movement of the control handle 54 to any of the five positions illustrated, through the medium of the gearing shown, effects a similar angular movement of the control shaft 47 and the cam 46.

As best seen in Fig. 3, the cam slot in the cam 46 includes a midportion 46a centrally located axially of the cam and disposed to position the clutch element 28 in the neutral center position illustrated in Fig. 1 when the handle 54 is in the position N. A second cam slot portion 46b extends angularly in one direction from the mid-portion 46a to shift the clutch element 28 to the left as viewed in Fig. 1 to engage the clutch element with the clutch teeth 33 when the control handle is moved to either of the positions FR or RR to cause rotation of the feed screw for effective table movement to the right. A third cam slot portion 46b extends angularly in the opposite direction from the mid portion 46a to cause movement of the clutch element 28 to the right, engaging the clutch element 28 and clutch teeth 36 to effect table movement to the left when the control handle is moved to the positions FL and RL.

The drive train to the driving bevel gear 38 is through a shaft 58 driven by bevel gearing 59 from a shaft 60 driven by spur gears 61 and a shaft 62. The shaft 62 is driven by spur gearing 63 from a shaft 64 adapted to be driven from a shaft 65 through the medium of any one of four sets of change speed gears 66, 67, 68 and 69. Shaft 65 is driven by spur gearing 70 from a shaft 71 and bevel gearing 72 driven by a motor 73. The gear train described is employed to cause rotation of the feed screw 14 at a feed rate in either direction, depending upon the position of clutch element 28, and at a variable speed depending on which set of change speed gears is engaged.

Rapid traverse rotation of the feed screw 14 is attained by means of a gear train bypassing the change speed gearing described and including a drive gear 76 fixed on the shaft 71 and meshing with a gear 77 rotatable on shaft 65 and in turn meshing with a gear 78 rotatable on shaft 64. The gear 78 meshes with a gear 79 integral with a driving clutch element 80 rotatable on shaft 62 and comprising the driving portion of an electric clutch having a driven clutch element 81 rotatable with shaft 62. The gearing 76, 77, 78 and 79, and the clutch 80, 81 are calculated to cause rotation of the feed screw 14 at a rapid traverse rate in either direction, depending upon the position of clutch element 28. An overrunning clutch 82 on the shaft 64 permits overdrive of the shaft 62 and spur gears 63 while the shaft 64 is driven by the change speed gearing referred to.

The electric clutch 80, 81 is controlled by an electric circuit (not shown) including a switch 85 (Figs. 1 and 2) supported in the base 10 and movable to a circuit closing position by means of a plunger 86 spring biased to a circuit opening position engageable with the side of the rack 50 which carries a cam portion 87 (Fig. 3) to cause closure of the switch when the control handle 54 is moved to the position RR and a cam portion 88 to cause closure of the switch when the control handle is moved to the position RL. The length of the cam slot in the barrel cam 46 is such that angular movement of control shaft 47 is permitted during movement of the control handle from either feed position to the adjacent rapid position while clutch element 28 remains engaged.

Means is provided to retain the drive selector mechanism in neutral and feed positions, including a sleeve 90 (Fig. 1) suitably keyed on the control shaft 47 and having angularly spaced recesses 91, 92 and 93 (Fig. 7) for receiving a spring pressed detent ball 94 when the control shaft is positioned respectively to place the drive in neutral, feed right and feed left. In moving the handle 54 and the control shaft 47 from either feed position toward neutral, once the detent ball is disengaged from either recess 92 or 93, the control shaft is biased toward the neutral position by oppositely acting spring pressed plungers 96 and 97 bearing respectively against abutments 98 and 99 on sleeve 90 to urge the shaft respectively from feed right and feed left toward neutral.

No detent means is provided to retain the selector mechanism in rapid right or rapid left positions, and the control shaft is urged from either such position toward the adjacent feed position by means including a pair of oppositely acting spring pressed plungers 101 and 102 engageable respectively with abutments 103 and 104 on the cam sleeve 46 to urge the control shaft respectively from rapid right to feed right position and from rapid left to feed left position.

The backlash takeup nut 25 on the feed screw 14 is controlled by means of a rack gear 105 having gear teeth meshing with the external gear teeth 26 on the takeup nut to turn the nut between a backlash takeup position and a release position on reciprocal movement of the rack. The rack is urged toward a release position by means of a spring 106 encircling a stop plunger 107 positioned in a bore in the base 10 and retained by stop screws 108. A reduced portion 109 at the opposite end of the rack bears against a backlash control cam 110 in the form of a sleeve slidably keyed on the control shaft 47 to rotate therewith. The cam 110 includes five angularly spaced portions including three angularly spaced low portions 111, 112, and 113 engageable with the rack when the control shaft is positioned respectively in neutral, rapid right and rapid left positions to permit spring actuation of the rack and takeup nut to a release position permitting a relatively free engagement between the feed screw and the nuts 17 and 25. This relieves the load on the feed screw during rapid traverse movements to thereby reduce wear and when the drive is in neutral frees the feed screw to readily permit manual adjustment by a hand wheel or the like which is usually provided in machines of the type described. The cam 110 includes angularly spaced high portions 114 and 115 on opposite sides of the neutral low portion 111 respectively for causing movement of the rack and takeup nut to takeup position when the control handle is in feed right and feed left positions. This causes rotation of the takeup nut on the feed screw until the shoulder 25a on the takeup nut abuts the base 10, to cause a tight working engagement between the feed screw and the nut elements, preventing any play of the feed screw axially in the nut elements. The rack and the takeup nut are locked in the takeup position by engagement of cam portion 114 or 115 with one end of the rack and engagement of the stop 107 with the other end of the rack.

The use of a backlash mechanism of the character described is particularly beneficial in machines intended for use in climb milling, because in such milling operations the milling cutter rotates in the direction of work travel and on engagement with the work will cause an undesirable advance of the work table due to lost motion in the feed screw and nut elements unless a takeup mechanism is provided. In conventional milling, similar problems do not exist for the reason that the milling cutter rotates in a direction opposite to work travel, opposing table movement, and causes no undesirable table advance. Thus it is desirable to provide an antibacklash mechanism where climb milling operations are contemplated, but it is less desirable and may even be undesirable to utilize an antibacklash mechanism where conventional milling is contemplated as the tight working engagement between the feed screw and nut elements provided by a backlash takeup causes undue wear on the screw and nut elements during conventional milling operations.

Figure 6:
Fig. 6 is an enlarged fragmentary sectional view taken at about the line 6—6 of Fig. 1.
Figure 5:
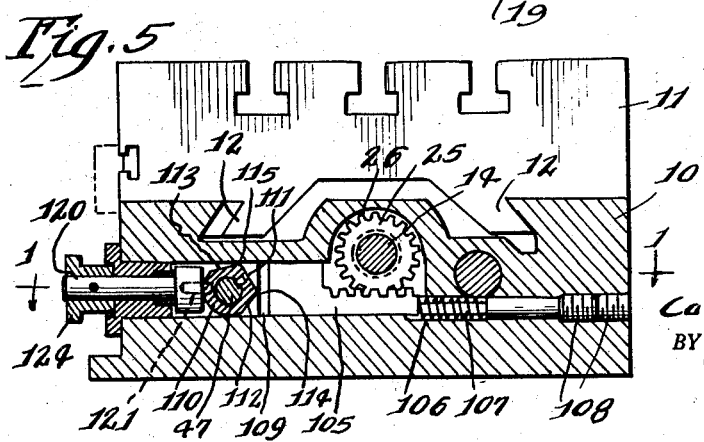
Fig. 5 is a transverse vertical sectional view taken at about the line 5—5 of Fig. 1 with the backlash takeup cam positioned for "feed right" movement of the work table.

According to the invention, means is provided to disable the backlash takeup mechanism for conventional milling operations and to render the backlash takeup inoperable during climb milling operations. The machine is then adapted for either type of milling operation. The means referred to partakes of an indexible stub shaft 120 rotatable in the base 10 on a horizontal axis normal to the axis of the control shaft 47 and having an eccentric pin 121 at its inner end projecting therefrom and receivable in a groove 122 in the backlash cam 110 so that rotation of the shaft from the position illustrated in Fig. 1 to move the pin 121 overcenter to a diametrically opposite position will shift the cam 110 axially from the position illustrated so that the rack 105 cannot engage any of the surfaces 111—115, and rotation of the control shaft therefore causes no actuation of the rack and takeup nut. The cam sleeve 110 includes a continuous low portion 123 (Figs. 3 and 6) axially spaced from surfaces 111—115 and engageable with the rack when the sleeve is shifted axially from the position illustrated. The portion 123 has a height equal the height of the low portions 111, 112 and 113 and a length circumferentially on the sleeve to maintain the rack and takeup nut in release positions for any angular position of the control shaft during conventional milling operations. The stub shaft 120 has a manually accessible knob 124 secured thereon to facilitate adjustment, and a spring pressed detent ball 125 is engageable with suitable recesses in the knob to retain the shaft in adjusted positions.

I claim:

1. In machine tool having a movable support, cooperating feed screw and nut elements for moving said support, and drive means for relatively rotating the feed screw and nut elements to drive the movable support including a selector movable to positions respectively for placing the drive means in neutral and feed, a backlash takeup mechanism including a takeup nut threaded on the screw element and rotatable between a takeup position to maintain a tight working engagement between the feed screw and nut elements and a release position to permit a free operating engagement between the feed screw and nut elements, gear teeth on the takeup nut, a rack gear meshing with said gear teeth to rotate the takeup nut between takeup and release positions, spring means urging the rack gear in one direction to turn the takeup nut toward release position, a rotatable cam engageable with the rack gear to oppose movement thereof by the spring, said cam having a low portion thereon permitting spring actuation of the rack to turn the takeup nut to release position and an angularly spaced high portion thereon to move the rack to turn the takeup nut to takeup position, and means connecting the selector to rotate the cam to turn the takeup nut to takeup position when the selector is in feed position and to rotate the cam to permit spring actuation of the rack to release position when the selector is in the neutral position.

2. The combination of claim 1, including selectively operable means to shift said cam axially from the operative position to an inoperative position disengaging the cam and the rack gear to render the rack gear and takeup nut inoperable when the selector is moved to feed position.

3. In a milling machine having a supporting element and a table element movable thereon, a feed screw journalled in one element, a feed nut fixed on the other element and threaded on the screw, and drive means for rotating the feed screw including a rotatable control shaft having angular positions corresponding to drive conditions including a neutral position, a feed position and a rapid traverse position, a backlash takeup mechanism including a takeup nut rotatable on said other element and threaded on the feed screw, gear teeth on the takeup nut, a rack gear meshing with said gear teeth to rotate the takeup nut between takeup and release positions, spring means urging the rack gear to turn the takeup nut toward release position, a cam keyed on the control shaft to rotate therewith and engageable with the rack gear to oppose spring movement of the rack, said cam having angularly spaced low portions permitting spring actuation of the rack to turn the takeup nut to release position when the control shaft is in the neutral and rapid traverse positions and a high portion to move the rack and takeup nut to takeup position when the control shaft is in the feed position.

4. The combination of claim 3, including selectively operable means to shift said cam axially between the position described engaging the cam and rack gear to render the takeup nut operable for down milling operations and an inoperative position disengaging the cam and rack gear to render the takeup nut inoperable for up milling operations.

5. In a milling machine having a base, a work table slidable on the base, a table feed screw journalled on the table, a feed nut fixed on the base and threaded on the screw, a reversible, variable speed drive for rotating the screw, and means for controlling the drive including a rotatable control shaft having angular positions corresponding to drive conditions including a neutral center position, feed right and rapid right positions angularly spaced in one direction from the neutral position, and feed left and rapid left angularly spaced in the opposite direction from neutral, a backlash takeup mechanism including a takeup nut threaded on the feed screw, rotatable on the base and abuttable thereagainst, gear teeth on the takeup nut, a rack gear meshing with said gear teeth to rotate the takeup nut between takeup and release positions, spring means urging the rack gear in one direction to turn the takeup nut toward release position, a cam keyed on the control shaft to rotate therewith and engageable with the rack gear to oppose movement thereof by the spring, said cam having angularly spaced low portions thereon permitting spring actuation of the rack to turn the takeup nut to release position when the control shaft is in the neutral, rapid right and rapid left positions and high portions thereon to move the rack to turn the takeup nut to takeup position when the control shaft is in feed right and feed left positions, and a stop engageable by the rack when shifted by said high portions to lock the rack and the takeup nut.

6. The combination of claim 5, including selectively operable means for disengaging the cam and rack gear to render the takeup nut inoperable for up milling operations and for engaging the cam and rack gear to render the takeup nut operable for down milling operations.

7. In a machine tool having a movable support, cooperating feed screw and nut elements for moving the support, and drive means for relatively rotating said screw and nut elements including a drive selector member positionable to alternatively establish neutral or drive conditions of the mechanism, the improvement comprising, a backlash takeup nut on said screw element movable between a takeup position and a release position, means mechanically interconnecting said drive selector member and said takeup nut for moving the latter to takeup position when the drive selector member is moved to drive position and for moving the nut to release position when the drive selector member is moved to neutral position, and selectively operable means for disabling said interconnecting means to render the same inoperative to move the takeup nut to takeup position when the selector is moved to drive position.

8. In a machine tool having a movable support, cooperating feed screw and nut elements for moving said support, and drive means for relatively rotating the screw and nut elements including a drive selector member positionable to alternatively establish neutral or drive conditions of the mechanism, in combination therewith, a backlash eliminator, comprising, a backlash takeup nut on the screw element movable between a takeup position and a release position, a driver connected to move the takeup nut, a rotatable cam for moving the driver, and means mechanically interconnecting the drive selector member and the cam for rotating the cam to move the takeup nut to takeup position when the drive selector member is moved to drive position and to move the takeup nut to release position when the drive selector member is moved to neutral position.

9. The combination of claim 8, including selectively operable means for disengaging the cam and driver thereby to render the cam inoperable to move the driver and takeup nut to takeup position when the selector is moved to drive position.

10. In a machine tool having a movable support, cooperating feed screw and nut elements for moving said support, and drive means for relatively rotating the screw and nut elements including a control shaft angularly movable selectively to different positions respectively for establishing different conditions of the drive means including neutral and feed conditions, the improvement comprising, a backlash takeup mechanism including a takeup nut threaded on the screw element and movable between a takeup position to maintain a tight working engagement between the feed screw and nut elements and a release position to permit a free operating engagement between the feed screw and nut element, a driver connected to move the takeup nut to takeup position, means resiliently urging the driver and takeup nut toward release position, a cam keyed on the control shaft to rotate therewith and engageable with the driver to turn the takeup nut to takeup position when the control shaft is turned to the feed position and to permit return of the driver and takeup nut to release position when the control shaft is turned to the neutral position.

11. The combination of claim 10, including selectively operable means to shift said cam axially from the operative position described to an inoperative position disengaging the cam and the driver thereby to render the cam inoperable to actuate the driver and takeup nut when the control shaft is turned to feed position.

12. The combination of claim 11 wherein said selectively operable means comprises, an indexible shaft normal to the control shaft, a groove in said cam and an eccentric pin in one end of the indexible shaft receivable in said groove to shift the cam axially when the indexible shaft is rotated, and a manually accessible knob for rotating the indexible shaft.

References Cited in the file of this patent

UNITED STATES PATENTS

| | | |
|---|---|---|
| 1,985,861 | Jereczek | Dec. 25, 1934 |
| 2,070,807 | Roehm et al. | Feb. 16, 1937 |
| 2,124,852 | Graves et al. | July 26, 1938 |
| 2,224,257 | Eisele | Dec. 10, 1940 |
| 2,302,575 | Romaine et al. | Nov. 17, 1942 |
| 2,345,194 | Granberg et al. | Mar. 28, 1944 |

FOREIGN PATENTS

| | | |
|---|---|---|
| 1,062,878 | France | Dec. 9, 1953 |